UNITED STATES PATENT OFFICE 1,932,688

SYNTHETIC RESIN

Merlin Martin Brubaker, Wilmington, Del., assignor to E. I. du Pont de Nemours & Company, Wilmington, Del., a corporation of Delaware No Drawing. Application February 1, 1933
Serial No. 654,761

7 Claims. (Cl. 260—8)

This invention relates to polyhydric alcohol-polybasic acid resins, and more particularly to improved resins of this class modified with non- and semi-drying fatty oils or fatty acids.

The use of fatty oils (or the acids derived from their saponification) as modifying agents for polyhydric alcohol-polybasic acid resins has been proposed heretofore to increase the flexibility, solubility, adhesion, and durability of protective films of these resins. Since these oils are related chemically, the ease of their incorporation into the resin does not seem to be dependent to any great extent on their drying properties, i. e., whether the oil is classified as drying, semi-drying, or non-drying (with the possible exception of castor oil, which is a hydroxy glyceride). However, the hardness and drying time of resins containing equal amounts of drying oils on the one hand and semi- and non-drying oils on the other hand is markedly different. If the oil content is above 25-30%, films flowed from solutions of semi- or non-drying oil modified resins will not dry, or at best, are extremely slow in setting up, even with driers and at elevated temperatures. While such resins can be mixed with nitrocellulose and used advantageously as coating compositions, the semi- or non-drying oil modified resins themselves which are suitable for this purpose are only those short oil resins (below about 25%) which are sufficiently hard in themselves (i. e., have a sufficiently high melting point) to set to a film primarily by evaporation of the solvent rather than by oxidation of the oil incorporated into the resin. However, the long oil modified resins are the type which is desirable from the standpoint of durability, solubility, and high solids content of solutions. The present invention, which sets forth methods for improving the semi- and non-drying fatty oil or fatty acid modified polyhydric alcohol-polybasic acid resins, is concerned with the removal of the above defects of these resins.

The resin art has been confronted with still another problem. The greatest use in the past for polyhydric alcohol-polybasic acid resins containing semi- or non-drying fatty components has been as constituents of nitrocellulose coating compositions. Although such coating compositions have an important commercial status, they possess an outstanding and recognized defect, viz, the development, on ageing, of an undesirable brittleness in the film. The unchanged ethylenic double bonds in the fatty constituent of the resin are probably the point of this slow but inevitable attack. The present invention, which sets forth methods for improving polyhydric alcohol-polybasic acid resins having semi- or non-drying fatty components, is also concerned with the solution of this problem.

This invention thus has as an object improved semi- and non-drying fatty oil and/or fatty acid modified polyhydric alcohol-polybasic acid resins and processes for making them. A further object is the improvement of polyhydric alcohol-polybasic acid resins from the standpoint of their utility in the coating composition art. A further object is the production of polyhydric alcohol-polybasic acid resins having semi- and non-drying fatty components which are harder and possess in themselves better drying characteristics. A still further object is the production of a more stable form of polyhydric alcohol-polybasic acid resin, a form which minimizes or eliminates the brittleness usually developing in nitrocellulose films containing these resins as ordinarily made. Other objects will appear hereinafter.

As is well known, fatty oils are widely distributed in nature, being present in and utilized by both the plant and animal kingdoms. Most of these oils are known in two different forms, these forms being characterized by different melting points. Chemically speaking, the change in melting point when one form changes to the other is generally supposed to be due to the formation of "geometric" isomers, commonly known as the "cis" (lower-melting) and "trans", or sometimes the "alpha" and "beta", forms. It is a striking observation that semi- and non-drying fatty oils, as they occur naturally, exist almost wholly in the form which can be most easily utilized or assimilated by the plant or animal, viz, that of lower melting point. It is in this form, termed herein the alpha form, that the non-drying and semi-drying oils have been used or proposed heretofore as modifying agents for polyhydric alcohol-polybasic acid resins.

I have discovered that if the naturally occurring alpha or lower melting form of the non- or semi-drying oil ingredient is converted to the beta or higher melting form before or after esterification of the polyhydric alcohol, the above noted objects are accomplished and a resin having greatly enhanced utility in the arts is produced.

In the preferred method of carrying out my invention, I first convert the alpha form of the fatty ingredient, (i. e., the non- or semi-drying oil or the acids derived from these oils), as completely as possible to the beta form, separate the latter from any unchanged alpha constituent, and esterify a polyhydric alcohol with a polybasic acid in the presence of the isolated beta form of the fatty ingredient. In a less preferred embodiment of the invention the step of separating the beta form is omitted; in such cases the resin is less improved, but its utility is still much greater than that of the corresponding resin made with the untreated fatty component. It is claimed by some authorities that fatty oils as they occur naturally contain traces of the beta forms. Although this is doubtful, any amounts which may be present are negligible in comparison to the amounts produced by the treatments described herein being in any case less than one percent. The improved properties of the resins modified with the beta forms of the oils or oil acids, on the other hand, do not become striking below a beta form proportion of 30% and is most striking when the substantially pure beta form is used.

Various methods may be used for the conversion of naturally occurring semi-drying or non-drying fatty oils into their higher melting forms, or what are usually believed to be geometric isomers and called for the purposes of the present invention the beta forms. Probably the best known of these methods is the so-called "elaidin", test, where the oil (e. g. olive oil) is shaken at room temperature with about 1–15% of its weight of freshly prepared nitrous acid, the higher melting form then being obtained after standing from a few minutes to several hours, depending on the oil. These oils which are for the most part simple glycerides set most rapidly, castor oil (mostly ricinolein) and olive oil (mostly olein) for example readily forming solids which are sometimes hard cakes, depending possibly on the temperature and amount of shaking. Oils which are mostly mixed glycerides or mixtures of glycerides (as cottonseed, corn, rapeseed, etc.) frequently do not set to a hard cake. This does not mean that the beta form is not present, but means simply that the mixture of the beta forms of the several glycerides present has depressed the melting point. The beta forms of such oils, while less desirable, nevertheless yield resins of greater utility than do the alpha or naturally occurring forms.

Nitrous acid of suitable strength for converting the oil or fatty acid to the beta form can be prepared, preferably just prior to use, by warming mercury with concentrated nitric acid. The oil or fatty acid is then shaken for a few minutes with about 12% of its weight of the freshly prepared nitrous acid and allowed to stand overnight in contact with the nitrous acid after which time maximum conversion into the beta form has probably taken place. It is then necessary to remove the nitrous acid. This can be done by dissolving in ether or other water-immiscible low boiling solvent, then washing repeatedly with water, or water containing a small amount of soluble carbonates. The ethereal solution, instead of being treated with alkalies, can be stirred with a suspension of metallic oxides, such as manganese dioxide or zinc oxide, then decanted or filtered after separation. The ether is finally evaporated, leaving behind the beta form, or a mixture of the alpha and beta forms, of the oil or fatty acid.

It should be understood that the invention is not dependent on any particular method of obtaining the beta form of the oil or fatty acid, and that it includes in its scope all methods for obtaining this higher melting form. It is known, for example, that iodine, chlorine, bromine, selenium, sodium bisulphite, nitrogen tetroxide, will cause the desired geometric isomerization.

In general, the preparation of the resin where one or more of the ingredients is the beta form of a fatty acid or of a semi- or non-drying fatty oil is carried out by heating the ingredients at any suitable temperature above their mixed melting point as in the range 150–300° C., preferably with stirring, until resinification occurs. Where the fatty oil is used, it is desirable first to heat the oil and polyhydric alcohol together, preferably in the presence of a trace of catalyst, such as litharge or sodium hydroxide, before adding the polybasic acid. The progress of resinification is followed by acid number determination, observations of the physical properties of test portions, such as solubility, hardness, color, homogeneity, etc. In general, heating is continued until an acid number, found or calculated to give a resin of optimum physical properties, is obtained. Prolonged heating at a high temperature (say above 225° C.) which produces only a small change in acid number is to be avoided, as it unduly raises the viscosity of solutions of the resin and will in many cases eventually cause the formation of an infusible, insoluble product. It is usually desirable not to deviate too far from chemically equivalent proportions of ingredients. No compensating change of proportions of polyhydric alcohol and polybasic acid is made when fatty oils are employed, contrary to the case where fatty acids are used. Due to the complex nature of the polyhydric alcohol-polybasic acid resin field, a general procedure, as well understood by those skilled in the art, may not be wholly satisfactory in all instances. For example, such factors as the nature of the polyhydric alcohol and polybasic acid (number of hydroxyl and carboxyl groups), the extent of the substitution of monohydric alcohols and monobasic acids for the polyhydric alcohol and polybasic acid, the nature and amount of natural resins, fatty oils (or other esters) present, the variation from stoichimetrical proportions of ingredients, etc., all present somewhat different requirements in heat treatment for best results. The optimum heat treatment for a particular resin falling in the field of the invention can probably best be deduced from the following examples in which the parts are by weight:

*Example I*

A pure grade of olive oil is converted to elaidin (beta form) as follows: Fifty parts of the oil is treated with 15 parts nitrous acid mixture (obtained by dissolving 9.0 parts mercury in 22.0 parts concentrated nitric acid of specific gravity 1.42), the mixture shaken for 2–3 minutes and allowed to stand 12–24 hours at a temperature below 25° C. A hard cake usually forms. This is broken up and dissolved in ether, chloroform, or other suitable organic solvent. The ethereal solution is washed several times with water, then shaken with dilute sodium carbonate solution. The emulsion which usually forms is broken by adding dilute hydrochloric acid in quantity just sufficient to neutralize the carbonate, then adding a very slight excess of carbonate and allowing to stand for several hours. The ethereal solution is finally washed again with water, the ether then being removed by evaporation or distillation, the last traces preferably in vacuo. The elaidin may also be precipitated from the ethereal solution by cooling to −60° C. The product thus obtained is a yellowish amorphous solid of melting point 34-36° C. It is incorporated into a resin as follows:

| | Parts by weight |
|---|---|
| Beta form of olive oil | 37.7 |
| Glycerol | 18.5 |
| Phthalic anhydride | 43.8 |
| | 100.0 |

The elaidin and glycerol are heated together with stirring in the presence of 0.05 part sodium hydroxide for one hour at 250° C. The phthalic anhydride is then added in small portions and heating continued for 5½ hours at 200° C., or until an acid number of 55-60 is obtained. The product is a dark brown resin, soluble in toluol, ethyl alcohol, butyl acetate, and alcohol—hydrocarbon mixtures.

Example II

Ninety-six parts pure oleic acid is converted into elaidic acid (beta form) by shaking with 16 parts nitrous acid mixture (prepared as in Example I), a pasty mass being formed. This is dissolved in ether, washed several times with water and the ether evaporated. This product is incorporated into a resin as follows:

| | Parts by weight |
|---|---|
| Beta form of oleic acid | 53.3 |
| Glycerol | 18.0 |
| Phthalic anhydride | 28.7 |
| | 100.0 |

The above ingredients are heated together with stirring at 250° C. for three hours. A dark but homogeneous resin is obtained which is soluble in toluol, ethyl acetate and acetone. This resin is valuable for preparing sanding lacquers or rubbing varnishes for furniture finishing.

The dark color of the above resin was due to incomplete removal of nitrous acid. With still more nitrous acid present, a still darker resin is obtained, and this is sometimes desirable depending upon the purpose for which the resin is intended. These very dark resins in dilute solutions are useful for staining wood prior to sanding and filling and subsequent application of a clear varnish.

While the resins of the preceding examples represent definite improvements over those from the same amounts of the alpha forms of the respective fatty components, the preferred embodiment of the invention is represented in the following example in which the pure beta form is separated prior to incorporation into the resin.

Example III

The beta form of castor oil is prepared by heating 2000 parts of the oil with 2 parts of selenium powder for three hours at 250° C. The paste so formed contains about 37% of the solid isomer. The separation of this mixture is accomplished by treating 10 parts of the mixture with 25 parts of petroleum ether or other aliphatic hydrocarbon solvents. The liquid portion dissolves the petroleum ether and is thereby thinned. The solid portion is then removed by filtering and further purified by a similar washing with petroleum ether. Practically pure ricinelaidin, a white waxy solid melting at 54-56° C. is thus obtained. This method of separating the beta form from the unchanged alpha form can also be used in the case of nitrous acid treated oils. Ricinelaidin is incorporated into a resin as follows:

| | Parts by weight |
|---|---|
| Ricinelaidin | 30.91 |
| Glycerol | 20.55 |
| Phthalic anhydrde | 48.54 |
| | 100.00 |

The above ingredients are heated together for 4-5 hours at 200° C. or to an acid number of 60-65. The resin is hard, light in color, and soluble in esters, alcohol-hydrocarbon mixtures, ketones, and aromatic hydrocarbons.

Example IV

| | Parts by weight |
|---|---|
| Ricinelaidin | 35.53 |
| Adipic acid | 45.25 |
| Ethylene glycol | 19.22 |
| | 100.00 |

The above ingredients are heated under a short air-cooled reflux for two hours at 150-160° C., then five and one-half hours at 225° C., or to an acid number of 40-45. There is obtained a clear pale resin which will just flow and which is soluble in hydrocarbons, acetone, and esters. This resin is suitable for use with nitrocellulose. Such films do not become as brittle on ageing as do those containing the corresponding resin made with an equal amount of ordinary castor oil.

The invention may also be carried out as indicated by the following example by treating the preformed resins with the agent which causes conversion of the fatty acid radicals therein to the beta form. However, the products obtained in this way do not have the greatly enhanced utility of those prepared from the beta form of the fatty component inasmuch as the former are somewhat susceptible to the influence of moisture and alkalie. Of most importance, however, is the fact that the fatty acid radicals are more difficult to convert to the beta form after being combined in the resin.

Example V

A resin is prepared by heating 53.3 parts ordinary oleic acid, 18.0 parts glycerol, and 28.7 parts phthalic anhydride for six hours at 225° C. or to an acid number of 4-6. This is a soft, dark brown product, of melting point 0.5-2.0° C. as determined by the mercury displacement method. Fifty parts of this resin is dissolved in fifty parts acetone, and the acetone solution agitated thoroughly with 7.5 parts nitrous acid mixture (prepared as in Example I) and allowed to stand for 48 hours. The resin is precipitated by pouring into water, the liquid decanted off, the resin dissolved in ether and the ethereal solution washed repeatedly with water. The ether is finally evaporated, the last traces in vacuo. The melting point as determined by the same method is 9-10° C. The rise in melting point is due to the conversion of at least a part of the oleic radicals in the resin from the alpha to the beta form, that is to elaidic radicals.

In order to obtain the improved resins disclosed herein it is necessary that the beta form of the resin ingredient be present in substantially greater quantity than is present in the commercial or naturally occurring non- and semidrying oils or the corresponding oil acids. It is preferable to use the substantially pure beta product isolated from the alpha form in the manner previously described. In any event, the alpha form must not be present in amount more than 70% by weight of the combined alpha and beta forms. Where the pre-formed resin is treated with the isomerizing agent, the treatment must be carried to the extent that at least 30% of the resinous ester is changed to the form containing beta form of the fatty acid radical.

Oils other than olive oil and castor oil which may be advantageously used are soya bean, rapeseed, cottonseed, peanut, sesame, neat's-foot, teaseed, etc., that is, any oil which, when combined in its alpha form in a polyhydric alcohol-polybasic acid resin, does not yield a product that hardens on exposure to the atmosphere (oxidation). Actually, this is determined by the drying properties of the oil (see International Critical Tables, vol. II, pp. 201–205 for classification of fatty oils on the basis of drying properties). This limitation on the basis of the drying properties of the oil is obvious since the improvements desired are not particularly in point in the case of the drying oil modified polyhydric alcohol-polybasic acid resins.

There is an exception to the above rule which should be noted. There are a few naturally occurring non-drying fatty oils which do not possess a sufficient unsaturation to be converted to a beta form. A number of substances properly classed as "vegetable fats" fall in this category; coconut oil and palm kernel oil are two such substances. These oils have iodine numbers in the range 10–15, and it is necessary that the iodine number be 70–75 or higher. This value is about that which is obtained when the fatty acid radicals in the oil have an average of one double bond. The fatty oils within the purview of this invention therefore range from those having sufficient unsaturation to yield an appreciable amount of beta isomer (as shown usually by iodine number of at least 70) to those that begin to impart definite oxidative drying properties to the resins made therefrom (as shown by the actual drying properties of the oils).

It should be pointed out again in this connection that, of the suitable oils, those which are composed for the most part, say 80%, of a single glyceride give more pronounced improvements when their beta forms are incorporated into the resins. Castor oil and olive oil are the most common examples of this type of oil, the former being composed mostly of ricinoleic glyceride and the latter oleic glyceride (i. e., ricinolein and olein).

When it is desired to employ the beta forms of the fatty oil acids, the saponification step is preferably, though not necessarily, carried out prior to the conversion to the beta form. Fatty acids suitable for conversion to the beta form may be of either natural or synthetic origin. If derived from fatty oils, their nature is limited in accordance with the previous limitations on the fatty oils. If of synthetic origin, or if derived from other natural sources, the suitable fatty acids can be defined as being those of at least 16 carbon atoms having one double bond.

The following table lists some of these acids. It is to be noted that perhaps the most convenient sources of acids of this type are the naturally occurring oils.

| Alpha form | | Beta form | |
|---|---|---|---|
| Common name | M. P. | Common name | M. P. |
| Oleic | 14° C. | Elaidic | 51° C. (See Ex. 2) |
| Petroselinic | 33° C. | Isopetroselinic | 54° C. |
| Ricinoleic | 17° C. | Ricinelaidic | 53° C. |
| Hypogaeic | 33° C. | Gaidic | 39° C. |
| Erucic | 33° C. | Brassidic | 66° C. |

I believe my invention, then, to be based on the principle illustrated in the following formulæ wherein COOH is replaced by COOR in the case of glycerides or other esters:

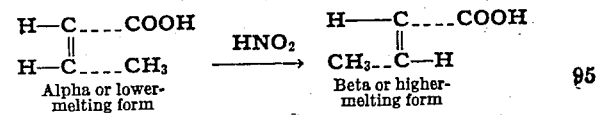

$$\begin{array}{c} \text{H—C——COOH} \\ \| \\ \text{H—C——CH}_3 \end{array} \xrightarrow{\text{HNO}_2} \begin{array}{c} \text{H——C——COOH} \\ \| \\ \text{CH}_3\text{——C——H} \end{array}$$

Alpha or lower-melting form → Beta or higher-melting form

Naturally occurring products of the above types contain only traces, if any, of the beta forms, and, although the natural products (i. e., the alpha isomers) have been subjected to various artificial treatments in a number of cases prior to their incorporation into polyhydric alcohol-polybasic acid resins, there is no indication that such treatments have produced more than negligible proportions of the beta isomers.

Although the previous discussion has been concerned mostly with the glycerol esters of the beta form of the fatty acid because of their greater commercial importance, it can be readily seen that the invention is equally applicable in principle to other esters, both of polyhydric alcohols such as ethylene glycol, pentaerythritol, monoethylin, and diethylene glycol, and of monohydric alcohols such as butyl alcohol, lauryl alcohol, cetyl alcohol, dimethylin, benzyl alcohol, etc. Examples of such compounds are elaidic glycolide, butyl recinelaidate, ethyl brassidate, etc.

Variations of the steps involved in making the resins will readily occur to those skilled in the resin art. Thus, the preparation of the resin can be carried out in open or closed vessels of glass, enamel, or of various metals such as iron, aluminum, Monel, etc., with or without the presence of holding agents such as urea and/or of esterification catalysts such as sulfonic acids. An atmosphere of an inert gas, such as nitrogen or carbon dioxide, tends to produce lighter-colored products. Mechanical agitation is advisable. Reduced or increased pressures can at times be used advantageously. Auxiliary condensing systems, such as a short air-cooled reflux which permits the water of reaction to escape but retains for the most part volatile resin ingredients, are often useful. The resinification may also be carried out in the presence of a solvent for the resin, which is non-reactive toward the resin and the ingredients thereof, the temperature of reaction (approximately the boiling point of the solvent) being adjusted by applying various pressures to the system. In such cases, mixed vapors of a solvent and water of reaction may be conveniently passed through a downward condenser, the water then being separated from the solvent by chemical or mechanical means and the latter returned continuously to the reaction vessel. Such non-reactive solvents are aromatic hydrocarbons or mixtures thereof, chlorobenzene, glycol diethyl ether, diclorodiethyl ether and in some cases terpene solvents and aliphatic hydrocarbons.

Suitable polybasic acids in addition to phthalic and adipic may be selected from such acids as succinic, sebacic, fumaric, tartartic, citric, dilactylic, thio-dilactylic, tri-carballylic, salicylacetic, chlorophthalic, pyromellitic, hexa-hydrophthalic, naphthalic, diphenic, and quinolinic. In general, any polybasic organic acid having at least four carbon atoms is suitable inasmuch as these are in general stable under the conditions of the reaction.

Likewise, the polyhydric alcohols other than glycerol or ethylene glycol known to be useful in the manufacture of polybasic acid resins may be used. These alcohols include butylene glycol, diethylene glycol, polyglycerols, pentaerythritol, poly-vinyl alcohol, mannitol, monoalkyl and aryl ethers of glycerol, etc.

Modifying agents (i. e., ingredients in addition to the requisite polyhydric alcohol, polybasic acid, and beta form of the fatty oil or fatty acid) which are useful in enhancing the improved properties of my resins are one or more of the following: (1) monohydric alcohols, such as butyl, lauryl, benzyl, and cyclohexyl; (2) natural resins and their esters such as rosin, Congo, and ester gum; (3) drying oils such as linseed and China wood; (4) monobasic acids not capable of being converted to a beta form, such as butyric, stearic, lactic, benzoic, and salicylic. The preformed resins, the fatty acid radicals of which are to be converted to the beta form, can also be modified by these substances.

The process disclosed herein makes possible the production of non- and semi-drying oil, or oil acid modified resins having uses for various purposes in the arts to which the resins of this class as heretofore produced were unsuited. The use of these resins as softeners for nitrocellulose markedly retards the development of brittleness in the film. The improved drying qualities and other properties possessed by the improved resins of this invention make possible for many purposes the substitution of the resins disclosed herein for the drying oil or oil acid modified resins.

The resins of the present invention are particularly useful as coating compositions. They may be used, either alone or combined by mutual solvents, by heating or by other means, with one or more of the following: cellulose derivatives such as nitrocellulose, cellulose acetate, cellulose acetopropionate, ethyl cellulose, and benzyl cellulose; natural gums, such as rosin, Kauri, and damar; combined natural gums, such as ester gum and ethyl abietate; drying oils, such as linseed and China wood oils; other synthetic resins, such as phenol-formaldehyde, amine-aldehyde, and vinyl; bitumens, such as asphalts. To my products, either alone or combined with the above substances, I may add pigments, fillers, lakes, plasticizers, antioxidants, solvents, etc., as needed and desired. Any of the known methods of applying the finish, such as spraying, brushing, baking, air-drying, etc. may be used.

Another important use for my improved resins is the manufacture of sanding lacquers or rubbing varnishes for furniture finishing. The products heretofore used for this purpose have been, for the most part, the stearic acid modified polyhydric alcohol-polybasic acid resins. These resins have an outstanding and recognized defect; viz, the film turns white or "blooms" and exudes stearic acid on ageing. Attempts have been made to substitute the corresponding oleic acid modified resin for the stearic acid resin to overcome this. These attempts have demonstrated that the oleic acid resins, while they do not show this defect of "blooming", are much too soft to be rubbed or sanded properly. If the oleic acid is first converted to elaidic acid, as in Example II, and then introduced into the resin, the product does not "bloom" and can be readily rubbed and sanded. It will be apparent, therefore, that the present process is a means for obtaining a harder resin from a fatty acid having one double bond.

Other uses to which the products of my invention are adapted are binders, cements, impregnating agents for paper, cloth, wood pulp, porous stone, etc., and the sandwiching material for glass plates and sheets of mica or cellulose acetate.

As many apparently widely different embodiments of this invention may be made without departing from the spirit and scope thereof, it is to be understood that I do not limit myself to the specific embodiments thereof except as defined in the following claims.

I claim:

1. A process which comprises converting from the alpha to the beta form an agent selected from the class consisting of non-drying fatty oils and semi-drying fatty oils having an iodine number of at least 70 and the acids derived from such oils by saponification, separating the beta form from the unconverted alpha form, and reacting a polyhydric alcohol with a polybasic acid and the separated beta form of said agent.

2. A process which comprises converting a member of the class consisting of acids of at least 16 carbon atoms having one double bond and esters thereof from the alpha to the beta form, separating the beta form from the unconverted alpha form, and reacting with heat treatment a polyhydric alcohol, a polybasic acid, and said separated beta form of the acid or ester until resinification occurs.

3. A process which comprises reacting with heat treatment a polyhydric alcohol, a polybasic acid, and modifying ingredients selected from the class consisting of ricinelaidic acid, ricinelaidin, elaidic acid, and elaidin until resinification occurs.

4. A resinous polyhydric alcohol ester consisting predominantly of the reaction product of a polyhydric alcohol with a polybasic acid and the beta form of a fatty oil acid selected from the class consisting of non-drying oil acids and semi-drying oil acids and having one ethylenic double bond.

5. A resinous composition of matter consisting predominantly of the reaction product of a polyhydric alcohol with polybasic acid and a modifying agent consisting of at least 30% of a member of the group consisting of ricinelaidic acid, ricinelaidin, elaidic acid, and elaidin.

6. A process which comprises converting a modifying agent of the class consisting of castor oil and castor oil acids to the beta form by heating the alpha form of said agent with selenium, and reacting a polyhydric alcohol with a polybasic acid and said beta form of said agent.

7. A resinous composition of matter containing selenium and comprising predominantly the reaction product of a polyhydric alcohol, a polybasic acid and the beta form of castor oil acid.

MERLIN MARTIN BRUBAKER.